United States Patent Office  3,112,176  Patented Nov. 26, 1963

3,112,176
BASE-EXCHANGE ZEOLITE AND METHOD FOR MAKING THE SAME
Walter L. Haden, Jr., Metuchen, and Frank J. Dzierzanowski, Somerset, N.J., assignors to Minerals & Chemicals Philipp Corporation, Menlo Park, N.J., a corporation of Maryland
No Drawing. Filed Oct. 4, 1961, Ser. No. 142,761
5 Claims. (Cl. 23—113)

This invention relates to a novel synthetic crystalline zeolite material.

An object of this invention is the provision of a zeolite possessing an exceptionally high base-exchange capacity.

A further object of this invention is the provision of a method for making a novel white crystalline sodium aluminum silicate from kaolin clay.

Further objects will be apparent from the description of this invention which follows:

After extensive experimentation with various aqueous systems of clay and alkalies, we have found that the reaction product or products obtained from such systems depend on the extent to which the clay has previously been calcined, alkali used, alkali dosage, reaction temperature and also alkali concentration. This experimentation has led to our discovery of a unique novel crystalline sodium aluminum silicate which possesses properties not found in known zeolites, natural or synthetic.

Stated briefly, the novel zeolite of this invention is a white hydrated sodium aluminum silicate which has the approximate $Na_2O:Al_2O_3:SiO_2$ mol ratio of 1:1:2. This material has an open framework structure of alumina and silica tetrahedra with a net change deficiency which is balanced electrically by cations contained in the voids of the lattice. It can be distinguished from other known zeolites and silicates by the fact that it possesses the following unique characteristic X-ray diffraction pattern:

| "d" Spacing, A. | Relative Line Intensity, $I/I_0$ |
|---|---|
| 7.08 | 64 |
| 4.98 | 38 |
| 4.07 | 68 |
| 3.15 | 100 |
| 2.89 | 17 |
| 2.54 | 65 |
| 2.49 | 8 |
| 2.36 | 12 |
| 1.96 | 15 |
| 1.78 | 8 |
| 1.62 | 5 |

This diffraction pattern, which does not agree with the pattern of any known silicates, natural and synthetic, differentiates our synthetic zeolite from other sodium aluminum silicates, even those of the same approximate chemical formula, such as, for example, sodalite and the material known as the "4A" zeolite.

A feature of our novel zeolite is that is possesses an unusually high base-exchange capacity—of the order of about 500 to about 700 meq./100 gm. The high base-exchange capacity of our novel sodium aluminum silicate also distinguishes this material from other synthetic crystalline hydrous sodium aluminum silicates of the same or similar empirical formula.

As a result of its exceptionally high base-exchange capacity, the zeolite of this invention is useful in processing water and solutions used in the chemical industries so as to remove therefrom undesirable metallic cations, such as, for example. $Ca^{++}$ and $Mg^{++}$. Thus, for example, our zeolite is useful in removing $Ca^{++}$ from sugar solutions so as to prevent sugar inversion.

The product of this invention, in finely divided form, is useful as a pigment or filler in the production of plastics and rubber goods.

Our novel silicate is obtained by refluxing clay, especially thermally dehydrated clay (metakaolin), with extremely dilute solutions of NaOH, i.e., solutions having a NaOH concentration less than 10%, and washing and drying the resultant precipitate. For reasons not presently understood, use in the process of NaOH solutions of 10% concentrations or more, leads to the formation of a different hydrated sodium aluminum silicate precipitate. Thus, a material consisting for the most part of 4A zeolite is obtained from metakaolin with NaOH solutions of about 10 to 20% concentration; sodalite formations become significant with more highly concentrated NaOH solutions.

For some applications, it may be desirable to use the zeolite in base-exchanged form, i.e., by exchanging the $Na^+$ for ions of: metals of group I and II of the periodic table, transition metals of the periodic table, hydrogen or ammonium. The zeolite may be used in the finely divided form in which it is precipitated or the powdered zeolite may be formed into pellets of suitable size using bonding agents such as are used in pelletizing industrial sorbents.

By "kaolin clay" is meant a naturally occurring clay containing at least one of the following as the chief mineral constituents: kaolinite, halloysite, anauxite, dickite and nacrite. The aforementioned minerals are hydrous aluminosilicates whose composition may be represented by the formula:

$$Al_2O_3.2SiO_2.XH_2O$$

where X is usually 2, or 4 in the case of certain halloysites. The weight ratio of $SiO_2$ to $Al_2O_3$ indicated by this formula is 1.177 to 1. Kaolin clays are frequently associated with foreign materials such as quartz, and the removal of such impurities from the starting clay is recommended.

To obtain metakaolin of suitable quality, kaolin is dehydrated by calcination at a temperature within the range of from about 800° F. to about 1600° F., and preferably 1200° F. to 1500° F. for a time sufficient to remove substantially completely the water of crystallization from the clay. Calcination should not be severe enough to cause the clay to undergo the characteristic kaolin clay exotherm.

In producing our novel sodium aluminum silicate from metakaolin, we use at least 2 mols of NaOH per mol of metakaolin ($Al_2O_3.2SiO_2$). Using 2 mols of NaOH per mol of metakaolin, it has been found that reaction requires about 30 hours for completion. Completion of reaction is determined by periodically analyzing the NaOH content of the aqueous phase of the reaction medium and ascertaining the point at which NaOH concentration of the reaction medium remains essentially constant. Using an excess of NaOH with metakaolin, e.g., 4 to 6 mols of NaOH per mol metakaolin in the dilute slurry, reaction is virtually complete in about 2½ hours. The concentration of the NaOH solution in our reaction medium is from about 1% to about 8% by weight.

Our invention will be more fully understood by the following examples.

EXAMPLE I

*a.* In accordance with this invention, 150 grams of commercial metakaolin (pigment 33) having an L.O.I. of 0.62% was slurried in 1500 milliliters of distilled water. The slurry was heated to about 215° F. in an agitated flask connected to a reflux condenser. To this slurry there was added with agitation a solution of 52.8 grams of NaOH in 300 milliliters of distilled water. The $Na_2O/Al_2O_3$ mol ratio of the composition was 1 to 1 and the $SiO_2/Al_2O_3$ mol ratio was 2 to 1. The NaOH concentration was 2.84%. The mixture was refluxed at about 215°

F. with agitation for about 50 hours. The slurry was then filtered, the insoluble precipitate washed with 5 liters of distilled water and dried at 220° F. for about ½ hour. An X-ray diffraction pattern of an equilibrated sample (70% R.H.) was obtained and the chemical analysis and physical properties of the dried products were evaluated.

*b.* Still in accordance with this invention, the procedure of Example I*a* was repeated, using, however, 2 mols of Na$_2$O per mol of Al$_2$O$_3$ in the reaction slurry by increasing the NaOH to 105.6 grams and maintaining the total water content at 1800 milliliters. The concentration of the NaOH solution was 5.54%.

*c.* Also in accordance with this invention, Example I*a* was repeated using 158.5 grams of NaOH and maintaining the water content of the slurry at 1800 milliliters and metakaolin at 150 grams to provide a 3:1 mol ratio of Na$_2$O to Al$_2$O$_3$ in the reaction mixture. NaOH concentration was 8.10%.

The chemical analysis of the products obtained from metakaolin and dilute NaOH solutions of varying NaOH/metakaolin ratios are reported in Table I. Properties of these products are summarized in Table II.

The data in Table I show that the quantity of sodium hydroxide reacted per mol of metakaolin was independent of the mol ratio of sodium hydroxide to metakaolin in the dilute slurry. In each reaction, irrespective of mol ratio of sodium hydroxide to metakaolin in the slurry, only 2 mols of sodium hydroxide reacted with each mol of metakaolin. This was confirmed by the chemical analysis of the products which had similar compositions.

The data in Table II show that physical properties of the products were similar with the exception of the base-exchange capacity which increased from 541 to 662 meq./100 gm. as the mol ratio of NaOH to metakaolin was increased from 2 to 6. Since the chemical composition of the products were similar, the difference in base-exchange capacity is logically attributed to a difference in crystallinity of the product. All of the samples had the X-ray diffraction pattern described above as being characteristic of our novel zeolite. However, the sample having the highest base-exchange capacity (Example I*c*) also had the most intense X-ray pattern. Anatase, a crystalline form of TiO$_2$, also showed up in the patterns (as a 3.49 A. line) and was attributed to an anatase impurity in the starting clay.

EXAMPLE II

KOH was substituted for the NaOH in Example I*a* to determine whether the zeolite of that example could be obtained with KOH as a reactant. No reaction between the KOH and metakaolin was detected under the conditions studied.

EXAMPLE III

Example I*a* was repeated using a reaction temperature of 100° F. and a reaction time of 143 hours to see if the formation of the novel zeolite depended on reaction temperature. There resulted an amorphous product (as determined by X-ray powder diffraction procedure). This product was found to have a relatively low base-exchange capacity of 50 meq./100 gm. and a low oil adsorption value of about 54 gm. oil/100 gm.

EXAMPLE IV

Repeating Example I*a* using uncalcined Georgia kaolin clay (Al$_2$O$_3$·2SiO$_2$·2H$_2$O) and refluxing the dilute aqueous NaOH-kaolin slurry containing 2 mols of NaOH per mol Al$_2$O$_3$·2SiO$_2$ for about 140 hours to provide for the slower reaction rate of the kaolin with the alkali, an impure form of our zeolite resulted. This product consisted of a mixture of the novel zeolite of this invention with kaolinite and had a base-exchange capacity of about 492 meq./100 gm. When Examples I*b* and I*c* using 4 and 6 mols of NaOH per mol of Al$_2$O$_3$·2SiO$_2$, respectively, were repeated using kaolin instead of metakaolin, the products had base-exchange values of only 164 and 178 meq./100 gm., respectively, and an X-ray pattern of sodalite. This indicates that an impure form of our novel base-exchange zeolite can be obtained using uncalcined kaolin clay instead of calcined kaolin as a starting material provided the NaOH solution is employed only in amount of 2 mols per mol Al$_2$O$_3$·2SiO$_2$ in the starting clay.

As used herein, surface area values are those obtained by a nitrogen absorption method described by S. Brunauer, P. H. Emmett and E. Teller in their article entitled "Adsorption of Gases in Multi-Molecular Layers," on page 309 of Journal of American Chemical Society, vol. 66, April 1944. Base-exchange capacities refer to values obtained using neutral ammonium acetate. X-ray powder diffraction patterns were obtained by standard procedures using K-α-radiation, an X-ray diffractometer using a scintillation counter and a strip chart pen recorder. The relative intensity of the peaks and the interplanar spacings (*d* values) were calculated from the peak heights recorded on the chart in conventional manner. Bulk density values refer to values determined by the settling method described in U.S. Patent No. 2,480,753 to W. S. W. McCarter.

*Table I*

CHEMICAL ANALYSIS OF SODIUM ALUMINUM SILICATE PRODUCTS

| Example No. | Mol Ratio of Reactants, Na$_2$O:Al$_2$O$_3$:SiO$_2$ | Chemical Analysis of Product | | | | | | |
|---|---|---|---|---|---|---|---|---|
| | | F.M.,[1] Percent | L.O.I.,[2] Percent | Na$_2$O,[3] Percent | Al$_2$O$_3$,[3] Percent | SiO$_2$,[3] Percent | Fe$_2$O$_3$,[3] Percent | TiO$_2$,[3] Percent |
| I*a* | 1 : 1 : 2 | 1.76 | 17.27 | 20.39 | 34.22 | 43.67 | 0.17 | 1.26 |
| I*b* | 2 : 1 : 2 | 4.60 | 18.24 | 21.88 | 34.73 | 42.23 | 0.12 | 1.18 |
| I*c* | 3 : 1 : 2 | 3.47 | 17.69 | 20.60 | 34.87 | 42.06 | 0.29 | 1.18 |

[1] Free moisture, determined by heating sample to essentially constant weight at about 220° F.
[2] Loss on ignition, determined by heating sample to essentially constant weight at about 1800° F.
[3] Reported on a volatile free basis.

*Table II*

PHYSICAL PROPERTIES OF SODIUM ALUMINUM SILICATE PRODUCTS

| Example No. | Mol Ratio of Reactants | Density | | Oil Absorption, gm. oil/ 100 gm. Sample | Surface Area, m.$^2$/gm. | BEX,[a] meq./ 100 gm. | pH of 5% Aqueous Slurry | Composition Calculated Mol Ratio |
|---|---|---|---|---|---|---|---|---|
| | Na$_2$O:Al$_2$O$_3$:SiO$_2$ | Bulk, lbs./ft. | True, gm./ml. | | | | | Na$_2$O:Al$_2$O$_3$:SiO$_2$:H$_2$O |
| I*a* | 1 : 1 : 2 | 31.3 | 2.47 | 137 | 8.7 | 541 | 11.05 | 0.98 : 1.00 : 2.17 : 3.46 |
| I*b* | 2 : 1 : 2 | 33.1 | 2.22 | 133 | 9.7 | 610 | 10.72 | 1.04 : 1.00 : 2.07 : 3.64 |
| I*c* | 3 : 1 : 2 | 33.0 | 2.26 | 123 | 10.5 | 662 | 10.72 | 0.97 : 1.00 : 2.04 : 3.48 |

[a] Base-Exchange Capacity.

We claim:

1. A synthetic crystalline base-exchange material consisting essentially of a hydrated sodium aluminum silicate containing about 1 mol $Na_2O$ per mol $Al_2O_3$ and about 2 mols $SiO_2$ per mol $Al_2O_3$, said material being further identified by possessing the following X-ray diffraction pattern:

| "d" Spacing, A. | Relative Line Intensity, $I/I_0$ |
|---|---|
| 7.08 | 64 |
| 4.98 | 38 |
| 4.07 | 68 |
| 3.15 | 100 |
| 2.89 | 17 |
| 2.54 | 65 |
| 2.49 | 8 |
| 2.36 | 12 |
| 1.96 | 15 |
| 1.78 | 8 |
| 1.68 | 5 |

2. A hydrated sodium aluminum silicate containing about 1 mol of $Na_2O$ per mol $Al_2O_3$ and about 2 mols of $SiO_2$ per mol $Al_2O_3$, said material having a base-exchange capacity of about 540 to about 660 meq./100 gm. and being characterized by possessing the following X-ray diffraction pattern:

| "d" Spacing, A. | Relative Line Intensity, $I/I_0$ |
|---|---|
| 7.08 | 64 |
| 4.98 | 38 |
| 4.07 | 68 |
| 3.15 | 100 |
| 2.89 | 17 |
| 2.54 | 65 |
| 2.49 | 8 |
| 2.36 | 12 |
| 1.96 | 15 |
| 1.78 | 8 |
| 1.68 | 5 |

3. A hydrated sodium aluminum silicate of the approximate empirical formula:

$$1\ Na_2O : 1\ Al_2O_3 : 2\ SiO_2 : 3.54\ H_2O$$

said material having a base-exchange capacity of about 540 to 660 meq./100 gm., a B.E.T. surface area of about 8 to 10 m.²/gm. and an oil absorption value of about 120 to 135 gm. oil/100 gm. and being further characterized by possessing the following X-ray diffraction pattern:

| "d" Spacing, A. | Relative Line Intensity, $I/I_0$ |
|---|---|
| 7.08 | 64 |
| 4.98 | 38 |
| 4.07 | 68 |
| 3.15 | 100 |
| 2.89 | 17 |
| 2.54 | 65 |
| 2.49 | 8 |
| 2.36 | 12 |
| 1.96 | 15 |
| 1.78 | 8 |
| 1.68 | 5 |

4. A method for making a base-exchange material which comprises mixing metakaolin with an aqueous solution of NaOH of about 1% to about 8% concentration using a quantity of solution sufficient to provide at least 2 mols of NaOH per mol of metakaolin and refluxing said mixture for a time sufficient to complete reaction between said metakaolin and said NaOH, and separating, washing and drying a precipitated reaction product, said reaction product being a hydrated sodium aluminum silicate containing about 1 mol $Na_2O$ per mol $Al_2O_3$ and about 2 mols $SiO_2$ per mol $Al_2O_3$ and being further characterized by possessing the following X-ray diffraction pattern:

| "d" Spacing, A. | Relative Line Intensity, $I/I_0$ |
|---|---|
| 7.08 | 64 |
| 4.98 | 38 |
| 4.07 | 68 |
| 3.15 | 100 |
| 2.89 | 17 |
| 2.54 | 65 |
| 2.49 | 8 |
| 2.36 | 12 |
| 1.96 | 15 |
| 1.78 | 8 |
| 1.68 | 5 |

5. The method of claim 4 in which said NaOH solution is used in amount sufficient to provide about 6 mols of NaOH per mol of metakaolin.

References Cited in the file of this patent

UNITED STATES PATENTS

| 2,992,068 | Haden et al. | July 11, 1961 |
| 3,009,776 | Sensel | Nov. 21, 1961 |

OTHER REFERENCES

Kummins et al.: "Ind. and Eng. Chem." 45, 567–72 (1953).

UNITED STATES PATENT OFFICE
CERTIFICATE OF CORRECTION

Patent No. 3,112,176        November 26, 1963

Walter L. Haden, Jr.

It is hereby certified that error appears in the above numbered patent requiring correction and that the said Letters Patent should read as corrected below.

Column 2, line 64, for "pigment 33" read -- Pigment 33 --.

Signed and sealed this 2nd day of June 1964.

(SEAL)
Attest:

ERNEST W. SWIDER
Attesting Officer

EDWARD J. BRENNER
Commissioner of Patents